US009802467B2

United States Patent
Qu et al.

(10) Patent No.: US 9,802,467 B2
(45) Date of Patent: Oct. 31, 2017

(54) SUNROOF CONTROLLER

(71) Applicant: Johnson Electric S.A., Murten (CH)

(72) Inventors: Nian He Qu, Shenzhen (CN); Xiao Ming Wang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 285 days.

(21) Appl. No.: 14/548,694

(22) Filed: Nov. 20, 2014

(65) Prior Publication Data
US 2015/0142274 A1 May 21, 2015

(30) Foreign Application Priority Data

Nov. 20, 2013 (CN) .......................... 2013 1 0589514

(51) Int. Cl.
*B60J 7/057* (2006.01)
*H02P 5/68* (2006.01)

(52) U.S. Cl.
CPC .............. *B60J 7/0573* (2013.01); *H02P 5/68* (2013.01)

(58) Field of Classification Search
CPC ..... B60J 7/0573; B60J 7/0007; B60R 25/245; B60R 25/2036
See application file for complete search history.

(56) References Cited

U.S. PATENT DOCUMENTS

| 5,250,882 | A | * | 10/1993 | Odoi | B60J 7/0573 296/223 |
|---|---|---|---|---|---|
| 5,734,727 | A | | 3/1998 | Flaherty et al. | |
| 2011/0118946 | A1 | * | 5/2011 | Reimann | B60R 25/2036 701/49 |
| 2011/0241847 | A1 | * | 10/2011 | Baruco | B60R 25/245 340/12.5 |
| 2013/0257108 | A1 | * | 10/2013 | Sugimoto | B60J 7/0007 296/214 |

* cited by examiner

*Primary Examiner* — Jerrah Edwards
*Assistant Examiner* — Mathew F Gordon
(74) *Attorney, Agent, or Firm* — Muncy, Geissler, Olds & Lowe, P.C.

(57) ABSTRACT

A panorama sunroof controller has a user interface, a sunroof glass, a sunshade, a first motor for driving the sunroof glass, a second motor for driving the sunshade and a driving module including a single chip microcomputer, a second relay driver and a sensor module. The single chip microcomputer and a first sensor are disposed on a circuit board. The first relay driver is coupled with the single chip microcomputer and drives the first motor near the circuit board. The second relay driver is coupled with the single chip microcomputer and drives the second motor far away the circuit board. a sensor module includes a second sensor coupled to the single chip microcomputer of the driving module through signal wires.

12 Claims, 4 Drawing Sheets

SUNROOF CONTROLLER

CROSS REFERENCE TO RELATED APPLICATIONS

This non-provisional patent application claims priority under 35 U.S.C. §119(a) from Patent Application No. 201310589514.0 filed in The People's Republic of China on Nov. 20, 2013, the entire contents of which are hereby incorporated by reference.

FIELD OF THE INVENTION

This invention relates generally to a control equipment and in particular to an automotive vehicle sunroof controller and a control method thereof.

BACKGROUND OF THE INVENTION

With the rapid advancement of automotive electronics, there has been an increasing quantity of electrical control units in modern vehicles. These electrical control units can be divided into powertrain system control (e.g., engine control and transmission control), chassis control (e.g., ABS system) and body control. Body Control Module ("BCM") is mainly used for improving the driving convenience and ride comfort. BCM system covers a wide range including lamp control, doors/windows control, seat control, air-condition control, instrument panel control, etc, and realizes performance and safety of a vehicle together with other systems. With the development of automation control, more and more body electrical equipment is used on an automotive body, which forces BCM to control more units. More information are shared between each electrical equipments, thus a strengthened data communication function is required for a BCM. Therefore, a single centralized BCM is hard to fulfill these huge functions, which leads to a trend of bus and network type of BCM. Lin (Local interconnect network) bus control method is also used for BCM communication, especially for BCM for simple control requirement of small communication traffic and slow communication rate, e.g., auto wiper and anti-pinch system.

Till now, more and more vehicles are equipped with panorama sunroofs. A panorama sunroof generally includes a sunroof glass and a sunshade. Due to the limitation of size and location, a sunshade glass need some cooperative action to enable the full open/close action of a panorama sunroof. In prior art, a sunroof glass and a sunshade are controlled respectively by individual Sunroof Controller Unit ("SCU"). Each SCU drive the panorama sunroof by Lin bus control. When a sunroof glass is being opened or closed, the corresponding SCU drive the sunshade through Lin bus, so as to avoid the position conflict of the sunroof glass and the sunshade. Thus, the Lin bus system is complex. The stability of the system is poor and the cost is high. Additionally, workers in a factory usually assemble wrong units into the sunroof glasses or sunshades because the SCU of them are of same shapes. Hence there is a desire for a sunroof controller which has a simple yet accurate control mechanism to control the air/gas volume ratio, preferably over a wide range.

SUMMARY OF THE INVENTION

Accordingly, in one aspect thereof, the present invention provides a controller, comprising: a single chip machine (also known as "microcontroller" or "single chip microcomputer" or "MCU") disposed on a circuit board; a first relay driver coupled with the single chip microcomputer and driving a first motor which is disposed beside the circuit board; a second relay driver coupled with the single chip microcomputer and driving a second motor which is disposed far away from the circuit board; a first sensor disposed on the circuit board; and a second sensor disposed beside the second motor and coupled with the single chip microcomputer. The single chip microcomputer receives signals from the first motor and second motor, responds to instructions from a user, and controls operation of the first relay driver and the second relay driver.

Preferably, the first sensor collects signals from the first motor and transfer the signals to the single chip microcomputer through printed circuits of the circuit board, and the second sensor collects signals from the second motor and transfer the signals to the single chip microcomputer remotely.

In another aspect of the present invention, it provides a panorama sunroof controller, comprising a single chip microcomputer disposed on a circuit board; and a first relay driver for controlling a sunroof glass, coupled with the single chip microcomputer and driving a first motor which is disposed beside the circuit board; a second relay driver for controlling the sunshade, coupled with the single chip microcomputer and driving a second motor which is disposed far away from the circuit board; a first sensor disposed on the circuit board and beside the first motor; and a second sensor disposed beside the second motor and coupled with the single chip microcomputer. The single chip microcomputer receives signals from the first motor and second motor, responds to instructions from a user, and controls operation of the first relay driver and the second relay driver.

Preferably, the first sensor collects position signals from the first motor and transfer the signals to the single chip microcomputer through printed circuits on the circuit board, and the second sensor collects position signals from the second motor and transfer the signals to the single chip microcomputer remotely.

Preferably, the controller further comprises a first relay and a second relay, wherein the first relay driver drives the first relay to control the first motor, and the second relay driver drives the second relay to control the second motor.

Preferably, the controller further comprises a Lin bus control module for receiving control signals through Lin protocol.

In another aspect of the present invention, it provides a panorama sunroof system, comprising a user interface, a sunroof glass and a sunshade; a first motor for driving the sunroof glass and a second motor for driving the sunshade; and a driving module. The driving module includes a single chip microcomputer disposed on a circuit board; a first relay driver coupled with the single chip microcomputer and driving the first motor which is disposed beside the circuit board; a second relay driver coupled with the single chip microcomputer and driving a second motor which is disposed far away from the circuit board; and a first sensor disposed on the circuit board and beside the first motor. A second sensor coupled to the single chip microcomputer of the driving module through signal wires. The single chip microcomputer receives signals from the first sensor and second sensor, responds to instructions from the user interface, and controls operation of the first relay driver and the second relay driver respectively.

Preferably, the first sensor collects position signals from the first motor and transfer the position signals of the sunroof glass to the single chip microcomputer through printed circuits on the circuit board, and the second sensor collects position signals from the second motor and transfer the position signals of the sunshade to the single chip microcomputer remotely.

Preferably, the panorama sunroof system further comprises a first relay and a second relay, wherein the first relay driver drives the first relay to control the first motor, and the second relay driver drives the second relay to control the second motor.

Preferably, the first sensor and the second sensor include a position sensor respectively.

Preferably, wherein the first sensor and the second sensor include a direction sensor respectively.

Preferably, the panorama sunroof system further comprises a Lin bus control module for receiving control signals through Lin protocol.

In another aspect of the present invention, it provides a method of operating a control system for use in an automotive vehicle panorama sunroof system having a sunroof glass and a sunshade, comprising: sending a first instruction to a single chip microcomputer disposed beside a sunroof glass; acquiring position signal of the sunroof glass from a first sensor disposed on a circuit board on which the single chip microcomputer is disposed; acquiring position signal of the sunshade from a second sensor remotely; and judging the position signals of the sunroof glass and sunshade and then driving the sunroof glass and sunshade accordingly.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

FIGS. 1(a)~1(d) illustrate the cooperation between the sunroof glass and the sunshade when the panorama sunroof is being opened. A metal roof 10 of an automotive vehicle is equipped with a sunroof glass a sunshade 20, and the sunroof glass includes a movable glass 30 and an unmovable glass 40. Generally speaking, a user interface of a driver may include four switches which are opening sunroof glass, closing sunroof glass, opening sunshade and closing sunshade. In case movable glass 30 and sunshade 20 do not conflict the position of each other, a user may activate the corresponding switch to give an order to movable glass 30 or sunshade 20, then movable glass 30 or sunshade 20 operates accordingly.

Basically, when movable glass 30 is being opened from original close position, sunshade 20 need to move for a small distance, so as to avoid any conflict of their position. Therefore, when movable glass 30 begins to tilt up, sunshade 20 begins to move accordingly. As movable glass 30 slides, if sunshade 20 is in same position with the movable glass 30, sunshade 20 must move simultaneously so as to forbid sunshade 20 to be exposed to external environment.

Figure 1A:
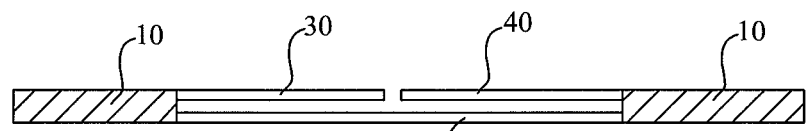
FIG. 1(a)~1(d) illustrate the cooperation between the sunroof and the sunshade when the panorama sunroof is opened, according to an embodiment of the present invention.

Referring to FIG. 1a, both movable glass 30 and sunshade 20 are in fully closed position originally. Movable glass 30 is approximately in the same plane with unmovable glass 40, and is parallel with sunshade 20.

Figure 1B:
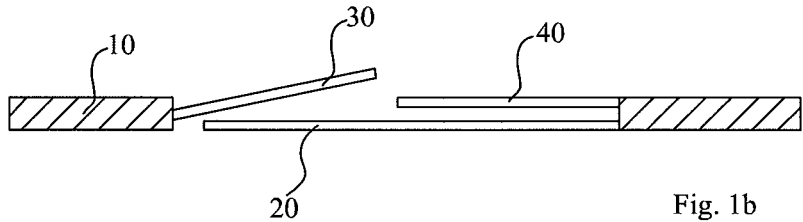

Referring to FIG. 1b, the user gives an order of opening sunroof glass, then sunshade 20 accordingly slides for a determined distance, meanwhile movable glass 30 tilts up to a position with a determined angle compared to sunshade 20.

Figure 1C:
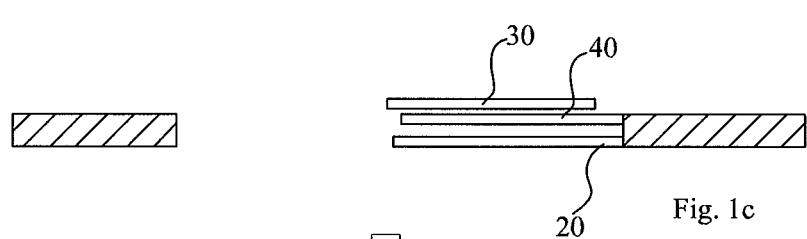

Referring to FIG. 1c, the user goes on giving the order of opening sunroof glass, then movable glass 30 accordingly slides on and finally arrives at top of unmovable glass, meanwhile sunshade 20 simultaneously slides to the position beneath the unmovable glass 40 and reaches a "half open" status.

Figure 1D:
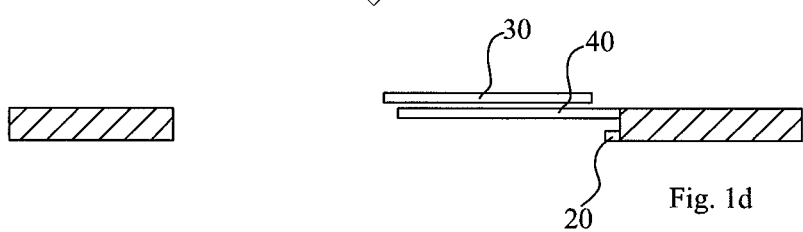

Referring to FIG. 1d, the user still goes on giving the order of opening sunroof glass, then movable glass 30 has been opened to the limit position and will not move on, while sunshade 20 slides on to the position of fully opened. The automotive carriage therefore acquires more sunshine. Thus, the user need not move fingers from switch of opening sunroof glass to switch of opening sunshade, which improve the user experience. It can be understood that the user may give the order of opening sunroof glass and movable glass 30 reaches its limit position, then the user move the finger to the order of opening sunshade, so as to acquire same operation purpose.

Thus, a user only need to operate one order of opening sunroof glass, and sunshade 20 does corresponding action according to the move of movable glass 30, so that the possibility of conflict of position of sunshade 20 and position of sunroof glass is avoided.

On the contrary, in case the panorama sunroof is in the fully opened position, then the user operates the switch of closing sunshade, sunshade 20 and movable glass 30 cooperates and do the actions from FIG. 1d to FIG. 1a, i.e., sunshade 20 firstly slides to the position of "half opened", the sunshade 20 and movable glass 30 simultaneously move to the position of fully closed.

For a purpose of convenient illustration, this application defines a first area in which movable glass 30 move from fully closed (i.e., FIG. 1a) to almost opened (i.e., the first area does not cover the position that movable glass 30 is fully opened) and in which sunshade 20 slides from fully closed (i.e., FIG. 1a) to half opened (i.e., FIG. 1c). This application also defines a second area in which sunshade 20 slides from half opened (i.e., FIG. 1c) to fully opened (i.e., FIG. 1d).

When the sunroof glass begins to be opened, sunshade 20 should start ahead of movable glass 30, When movable glass 30 reaches an position of same open degree with sunshade 20, they are regarded as simultaneous position. When movable glass 30 reaches an position of open degree later than position of sunshade 20, movable glass 30 is regarded as later than sunshade 20.

Figure 2:
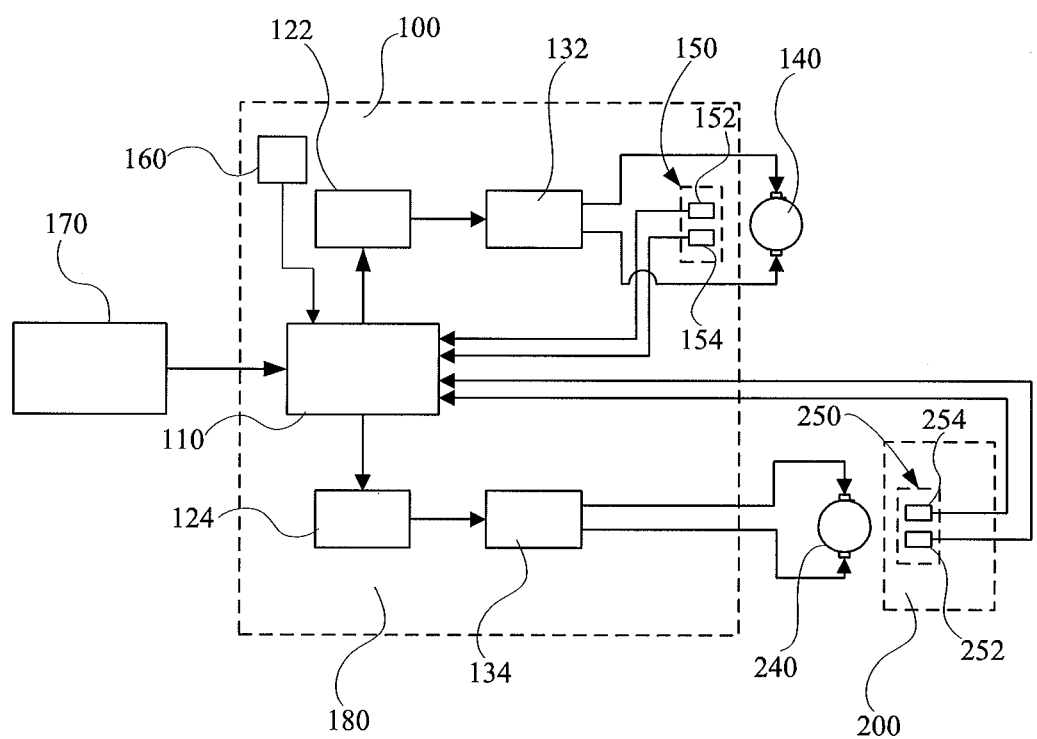
FIG. 2 is an electrical schematic diagram illustrating the panorama sunroof drive system, according to an embodiment of the present invention.

FIG. 2 is an electrical schematic diagram illustrating the panorama sunroof drive system, according to an embodiment of the present invention. It should be noted that the FIG. 2 only shows necessary parts for the purpose of illustration of the structure. For example, panorama sunroof also includes power management system to manage electrical power of the controller. In this embodiment, the panorama sunroof control system comprises user interface 170, controller (or named control module/driving module) 100, sunroof glass driving motor 140, sunshade driving motor 240 and sunshade sensor module 200. In one embodiment, driving module 100 comprises electrical circuit board 180, on which Single Chip Microcomputer (SCM) 110, sunroof glass relay driver 122, sunshade relay driver 124, sunroof glass relay 132, sunshade relay 134 and sunroof glass sensor 150 are disposed. Sunroof glass relay driver 122 and sunshade relay driver 124 are connected with ports of SCM 110, and are connected with sunroof glass relay 132 and sunshade relay 134 respectively.

Driving module 100 is disposed near sunroof glass driving motor 140. Thus sunroof glass sensor 150 disposed on driving module 100 is able to acquire the rotation signal from sunroof glass driving motor 140 directly, and acquire position signal of movable glass 30 accordingly. Sunroof glass sensor 150 then transfers position signals of movable glass 30 to SCM 110 through electrical circuit of electrical circuit board 180. Sunroof glass relay 132 of driving module 100 drives sunroof glass driving motor 140 to rotate forward or reverse, so as to drive movable glass 30 to be opened or closed. sunroof glass sensor 150 comprises position sensor 152 and direction sensor 154, through which position signals and move direction signals are transferred to SCM 110.

A sunshade sensor module 200 mainly comprises a sunshade sensor unit 250. Sunshade relay 134 of driving module 100 drives sunshade driving motor 240 to rotate forward or reverse, so as to drive sunshade 20 to be opened or closed. Sunshade sensor unit 250 of sunshade sensor module 200 is not disposed on driving module 100, so it need signal wires to transfer position signals and move direction signals of sunshade 20 to remote SCM 110 of driving module 100. Sunshade sensor unit 250 comprises position sensor 252 and direction sensor 254, through which position signals and move direction signals are transferred to SCM 110. signal wires may be analog wires or digital wires. In a preferred embodiment, driving module 100 further includes Lin control module 160 so that driving module 100 is able to receive orders through Lin bus control method and therefore control the panorama sunroof. It should be understood that Lin bus module can also control movable glass 30 and sunshade 20 through the user interface 170.

People skilled in the art can understand that the methods by which SCM 110 controls sunroof glass driving motor 140 and sunshade driving motor 240 can be various. For example, SCM 110 may control motors by field-effect transistor. Sunroof glass sensor unit 150 and sunshade sensor unit 250 may only include position sensors and move direction sensors, and also may include other type of sensor according to requirements.

Figure 3:
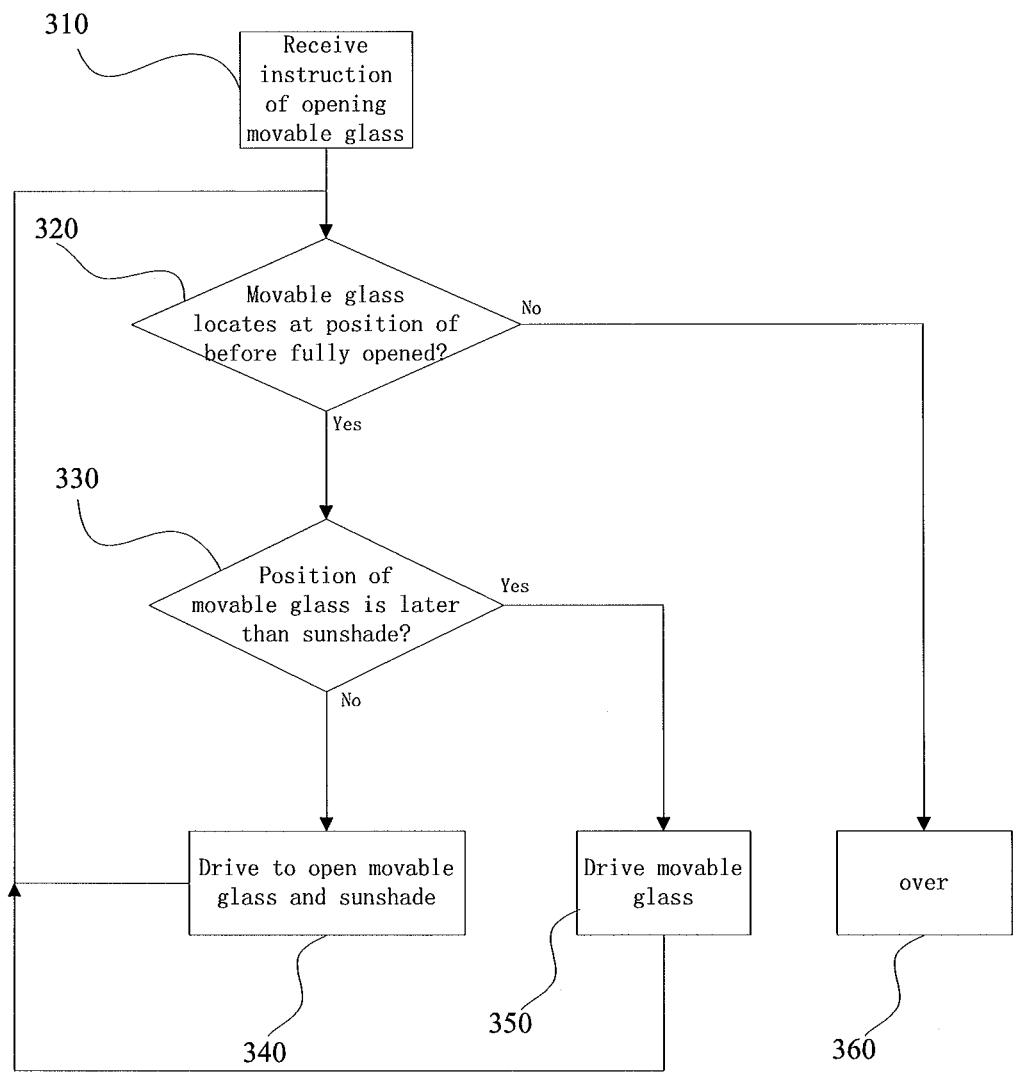
FIG. 3 is a flowchart showing how a panorama sunroof system operates to open the sunroof and sunshade, in accordance with an embodiment of the present invention.

FIG. 3 is a flowchart showing how a panorama sunroof system operates to open the sunroof and sunshade, in accordance with an embodiment of the present invention. In this embodiment, SCM 110 receives signals from sunroof glass sensor unit 150 and sunshade sensor unit 250, and refers to current user instruction, then makes an judgment and give driving instructions to sunroof glass driving motor 140 and sunshade driving motor 240 respectively.

At step 310, SCM 110 of driving control module 100 receives the instruction of opening movable glass 30 of sunroof glass from the user. At step 320, sunroof glass sensor unit 150 of driving control module 100 monitors the position of movable glass 30 and send these signals to SCM 110 of driving control module 100. If movable glass is at first area (i.e., before the position of fully opened), the processing comes to step 330 for the next judgment. If movable glass is not at first area (i.e., at the position of fully opened), the processing comes to step 360 to finish actions.

At step 330, sunshade sensor unit 250 transfer the position signal of sunshade 20 to SCM 110 of driving module 100. SCM 110 judges whether movable glass 30 is simultaneous with sunshade 20. If the position of movable glass 30 is simultaneous with (i.e., not later than) sunshade 20, the processing comes to step 340, SCM 110 gives instruction to open both movable glass 30 and sunshade 20. If the position of movable glass 30 is later than sunshade 20, the processing comes to step 350, SCM 110 gives instruction to only open movable glass 30. Sunroof glass sensor 150 keeps sending position signals of movable glass 30 back to SCM 110, then the processing comes to step 320 and 330 over and again. When the position of sunshade 20 is simultaneous with sunroof glass 30, the processing comes to step 340 and open both sunroof glass 30 and sunshade 20 simultaneously. It can be understood that if sunshade 20 is originally at the position between half open and fully open, movable glass will keep action of step 350 till it reaches the position of fully opened.

Figure 4:
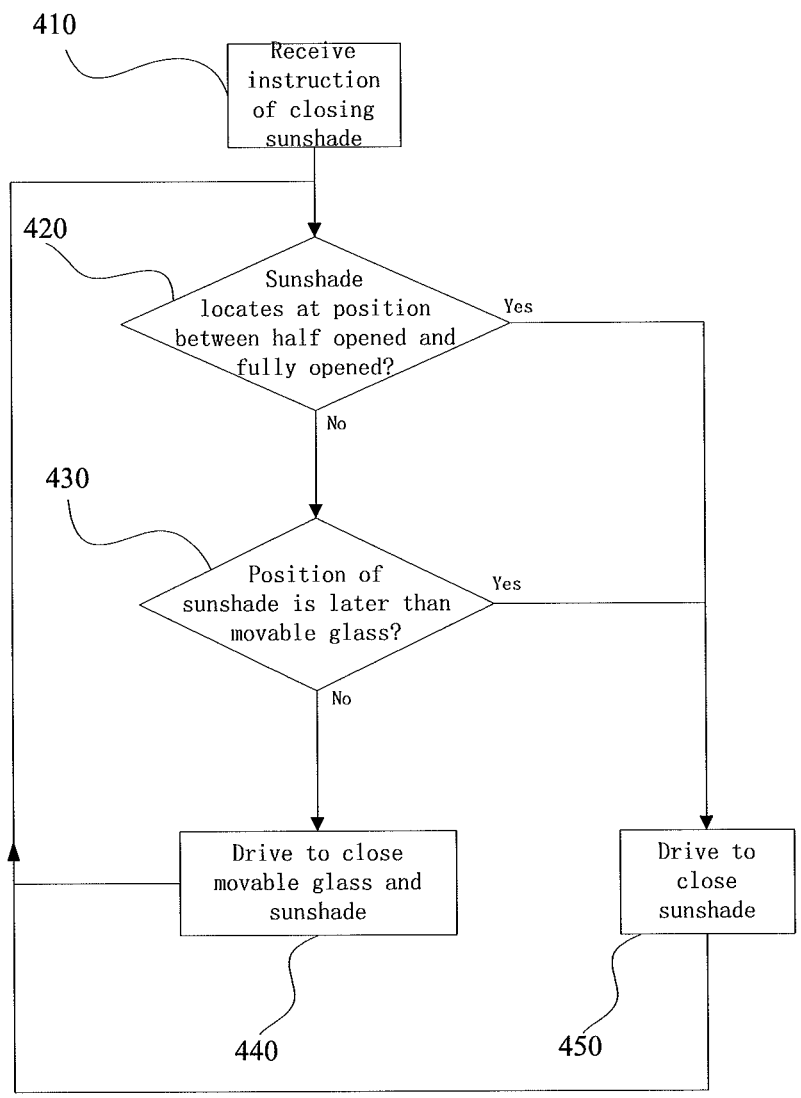
FIG. 4 is a flowchart showing how a panorama sunroof system operates to close the sunroof and sunshade, in accordance with an embodiment of the present invention.

FIG. 4 is a flowchart showing how a panorama sunroof system operates to close the sunroof and sunshade, in accordance with an embodiment of the present invention. In this embodiment, SCM 110 receives signals from sunroof glass sensor unit 150 and sunshade sensor unit 250, and refers to current user instruction, then makes an judgment and give driving instructions to sunroof glass driving motor 140 and sunshade driving motor 240 respectively.

At step 410, SCM 110 of driving control module 100 receives the instruction of closing sunshade 20 from the user. At step 420, sunshade sensor unit 250 of sunshade sensor module 200 monitors the position of sunshade 20 and send these signals to SCM 110 of driving control module 100. If sunshade 20 is at second area (i.e., between the position of half opened and fully opened), the processing comes to step 450 and driving module 100 drives sunshade driving motor 240 to close sunshade 20. If sunshade 20 is at first area (i.e., between the position of half opened and fully closed), the processing comes to step 430 for a further judgment.

At step 430, sunroof glass sensor 150 transfer the position signal of movable glass 30 to SCM 110 of driving module 100. SCM 110 judges whether movable glass 30 is simultaneous with sunshade 20. If the position of sunshade 20 is simultaneous with (i.e., not later than) movable glass 30, the processing comes to step 440, SCM 110 gives instructions to sunroof glass relay driver 122 and sunshade relay driver 124 to close both movable glass 30 and sunshade 20. If the position of sunshade 20 is later than movable glass 30, the processing comes to step 450, SCM 110 gives instruction only to sunshade relay driver 124 to close sunshade 20. Position signals of sunshade 20 are sent back to SCM 110, then the processing comes to step 420 and 430 over and again. When the position of sunshade 20 is simultaneous with sunroof glass 30, the processing comes to step 440 and closes both sunroof glass 30 and sunshade 20 simultaneously. It can be understood that if movable glass 30 is originally at the position of fully closed, sunshade 20 will keep action of step 450 till it reaches the position of fully closed.

It should be appreciated that a sunroof controller according to the present invention, can control panorama sunroof to open/close through a sunroof driving module 100 and a sunshade driving module 200. Additionally, this invention only need to manufacture sunroof driving module 100 as PCB assembly, and sunshade driving module 200 sends signals to sunroof driving module 100 directly to realize the cooperation between movable glass 30 and sunshade 20. A user only send instructions to sunroof driving module 100 to drive sunshade 20, thus the system does not need two driving modules to be controlled respectively by Lin bus control to cooperate with each other. Therefore, automotive control source is saved, the stability of the system is improved, the cost is reduced and the weight of controller is reduced. Additionally, the misoperation of works is reduced sue to the difference between sunroof driving module 100 and sunshade driving module 200.

In another embodiment according to this invention, Lin control module 160 can be disposed on sunroof driving module 100, so that a user can remotely control sunroof driving module 100 directly through Lin bus control.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. For example, sunroof glass sensor 150 can transfer position signals of sunroof glass driving motor 140 by short distance method rather than printed circuit. Therefore, the scope of the invention is to be determined by reference to the claims that follow.

The invention claimed is:

1. A controller, comprising:
a single chip microcomputer disposed on a circuit board;
a first relay driver coupled with the single chip microcomputer and driving a first motor which is disposed adjacent to the circuit board;
a second relay driver coupled with the single chip microcomputer and driving a second motor which is disposed farther from the circuit board than the first motor;
a first sensor disposed on the circuit board; and
a second sensor disposed adjacent to the second motor and coupled with the single chip microcomputer,
wherein the single chip microcomputer receives signals from the first motor and second motor, responds to instructions from a user, and controls operation of the first relay driver and the second relay driver respectively.

2. The controller of claim 1, wherein the first sensor collects signals from the first motor and transfer the signals to the single chip microcomputer through printed circuits of the circuit board, and the second sensor collects signals from the second motor and transfer the signals to the single chip microcomputer remotely.

3. The sunroof controller of claim 1, further comprising a LIN bus control module for receiving control signals through LIN protocol.

4. A panorama sunroof controller, comprising:
a single chip microcomputer disposed on a circuit board;
a first relay driver for controlling a sunroof glass, coupled with the single chip microcomputer and driving a first motor which is disposed adjacent to the circuit board;
a second relay driver for controlling the sunshade, coupled with the single chip microcomputer and driving a second motor which is disposed farther from the circuit board than the first motor;
a first sensor disposed on the circuit board and adjacent to the first motor; and
a second sensor disposed adjacent to the second motor and coupled with the single chip microcomputer,
wherein the single chip microcomputer receives signals from the first motor and second motor, responds to instructions from a user, and controls operation of the first relay driver and the second relay driver respectively.

5. The sunroof controller of claim 4, wherein the first sensor collects position signals from the first motor and transfer the signals to the single chip microcomputer through printed circuits on the circuit board, and the second sensor collects position signals from the second motor and transfer the signals to the single chip microcomputer remotely.

6. The sunroof controller of claim 5, further comprising a first relay and a second relay, wherein the first relay driver drives the first relay to control the first motor, and the second relay driver drives the second relay to control the second motor.

7. A panorama sunroof system, comprising:
a user interface, a sunroof glass and a sunshade;
a first motor for driving the sunroof glass and a second motor for driving the sunshade;
a driving module, including,
a single chip microcomputer disposed on a circuit board;
a first relay driver coupled with the single chip microcomputer and driving the first motor which is disposed adjacent to the circuit board;
a second relay driver coupled with the single chip microcomputer and driving a second motor which is disposed farther from the circuit board than the first motor; and
a first sensor disposed on the circuit board and adjacent to the first motor; and
a second sensor coupled to the single chip microcomputer of the driving module through signal wires;
wherein the single chip microcomputer receives signals from the first sensor and second sensor, responds to instructions from the user interface, and controls operation of the first relay driver and the second relay driver respectively.

8. The panorama sunroof system of claim 7, wherein the first sensor collects position signals from the first motor and transfer the position signals of the sunroof glass to the single chip microcomputer through printed circuits on the circuit board, and the second sensor collects position signals from the second motor and transfer the position signals of the sunshade to the single chip microcomputer remotely.

9. The panorama sunroof system of claim 8, further comprising a first relay and a second relay, wherein the first relay driver drives the first relay to control the first motor, and the second relay driver drives the second relay to control the second motor.

10. The panorama sunroof system of claim 7, wherein the first sensor and the second sensor include a position sensor respectively.

11. The panorama sunroof system of claim 7, wherein the first sensor and the second sensor include a direction sensor respectively.

12. The panorama sunroof system of claim 7, further comprising a Lin bus control module for receiving control signals through Lin protocol.

* * * * *